United States Patent [19]
Taylor

[11] 3,863,231
[45] Jan. 28, 1975

[54] READ ONLY MEMORY WITH ANNULAR FUSE LINKS

[75] Inventor: Wilfred Kenelm Taylor, Richmond, England

[73] Assignee: National Research Development Corporation, London, England

[22] Filed: July 23, 1973

[21] Appl. No.: 381,701

[52] U.S. Cl. .......... 340/173 SP
[51] Int. Cl. .......... G11c 17/00
[58] Field of Search .......... 340/173 SP, 166 R

[56] References Cited

UNITED STATES PATENTS

| | | | |
|---|---|---|---|
| 2,872,664 | 2/1959 | Minot | 340/173 SP |
| 3,245,051 | 4/1966 | Robb | 340/173 SP |
| 3,582,908 | 6/1971 | Koo | 340/173 SP |
| 3,599,183 | 8/1971 | Groeger | 340/173 SP |
| 3,704,455 | 11/1972 | Scarbrough | 340/173 SP |
| 3,717,852 | 2/1973 | Abbas et al. | 340/173 SP |

*Primary Examiner*—Stuart N. Hecker
*Attorney, Agent, or Firm*—Oblon, Fisher, Spivak, McClelland & Maier

[57] ABSTRACT

A memory device has a set of input conductors disposed at right angles to a set of output conductors with each input conductor connected to each output conductor by a respective resistive fusible link. In use, information is written in to the memory device by passing currents large enough to fuse selected links. All the fusible links have resistance and dimensions such that they are not fused by application of a voltage of predetermined magnitude but are fused by application of a voltage of twice such predetermined magnitude.

9 Claims, 17 Drawing Figures

READ ONLY MEMORY WITH ANNULAR FUSE LINKS

This invention relates to memory devices and more particularly to memory devices which are initially programmed by passing an electric current exceeding a predetermined magnitude through selected parts of the memory device to fuse links therein, and thereafter used as read-only memories.

The use of fusible links diode matrix memories is already known and is disclosed in United Kingdom Patent Specification No. 1,220,843. During programming, a large voltage is employed in order to ensure reliable fusing and the diodes connected to links adjacent to the link being fused are reverse biased so as to prevent inadvertent fusing. However, with diode matrix memories, the resistance between an input conductor and an output conductor, via a diode link is either infinity if the link is fused, or very low if the link has not been fused. Accordingly, if a voltage is detected on an output conductor from such a matrix at a time when voltages are applied to input conductors which were originally connected to such output conductor via respective diodes and fusible links, there is no means of telling how many of such fusible links are intact since there is no means of obtaining the algebraic sum of the voltages applied to the input conductors.

According to the present invention, there is provided a memory device comprising insulating materials supporting a plurality of first conductors, a plurality of second conductors, and a plurality of electrical resistor links each providing an ohmic connection between a first conductor and a second conductor, each link comprising a layer of electrically conductive material deposited on said insulating material and having dimensions and electrical resistance such that application of a voltage exceeding a predetermined magnitude passes between a first conductor and a second conductor causing fusing of the corresponding link over an area of said layer surrounding said first conductor but application of a voltage of half said predetermined magnitude does not cause fusing of said link.

The provision of fusible links with identical accurately controlled fusing characteristics enables coincident-current addressing techniques to be used during programming so that diodes are not required.

It is important for the resistance of the links to be considerably higher than, for example 100 times the resistance of the first and second conductors. Preferably this factor is even larger, for example 1,000 times.

Information is read in to the store either by removing links in a pattern corresponding to the information which it is desired to store or by leaving those links which correspond to the information it is desired to store and removing the remainder.

According to a feature of the invention the first and second conductors may be grouped in pairs with a first input conductor of each pair connected to one of the output conductors of each pair by a respective set of links and a second input conductor of each pair connected to the other output conductor of each pair by another respective set of resistive elements. In use, means are provided for applying an input signal to a selected input conductor or conductors of a pair of input conductors and for detecting output signals developed at each pair of output conductors.

In practice, one input signal can be utilised to control the application of a potential to each pair of input conductors and a single output signal can be derived from each pair of output conductors by means of a differential amplifier connected across the conductors of each pair. Furthermore, by means of the use of suitable level shifting circuits the output signals derived from one memory device can be utilised as the input control signals for other memory devices.

In the so-called linear separation method of pattern recognition a number of resistors are connected together in parallel in a manner which depends upon specific patterns to be recognised. Connections are made to the resistors in such a manner that for an input pattern having "$d$" components there are synthesised "$c$" output signals of the form $$X_{oi} \sum_{r=1}^{r=d} W_{ir} \cdot X_r$$

where $i = 1, 2, 3 \ldots c$, and $r = 1, 2, 3 \ldots d$ represents the input components. The weighting factor $W_{ir}$ by which each input component is multiplied is dependent upon whether a particular input component is greater or less than the mean value of the input components. The number of weighting factors is equal to the product of the input components, or dimensions, $d$ and the number of output signals, or classes, $c$ and can be very large. For example, in the case of finger prints, $d$ may be $10^3$ and $c$ may be as many as $10^7$, giving $10^{10}$ as the number of weighting factors. As may be appreciated, in practice this presents a formidable wiring problem. The present invention provides a means of alleviating this problem because when a plurality of the information stores are stacked, contacts on each store can be arranged to establish a good conducting path without further wiring, and the input voltage may thus be applied to a very large number of stacked stores in parallel. The stores may also be made to be very thin so that it is possible to condense into a relatively small volume high capacity memories such as those required for the recognition of finger prints, faces or words. In the case of alpha-numeric characters, a large number of type fonts, sizes and positions are easily accommodated.

In order that the invention may be more fully understood reference will now be made to the accompanying drawings in which.

Figure 1:
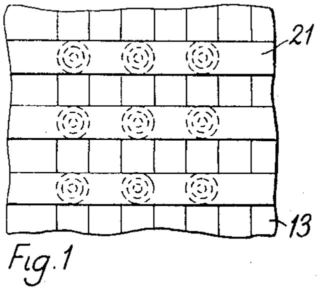
FIG. 1 shows a plan view of an embodiment of the invention.
Figure 2:
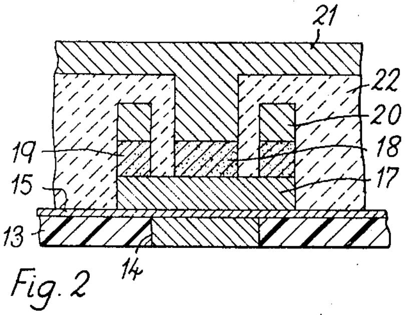
FIG. 2 shows to an enlarged scale a section of an element of the embodiment of FIG. 1.

FIGS. 1 and 2 show a memory device in accordance with the invention. A substrate 13 made of an insulating material has an array of holes 14 formed in it. A thin conductive layer 15 is formed on one surface of the substrate 13 and the holes 14 are filled with a low-resistivity metal to provide an array of contacts 16 to the conductive layer 15. On the other side of the layer 15 there is deposited, by well-known evaporation techniques, an array of conductive discs 17 of somewhat greater area than the contacts 16. The discs 17 are overlaid, again by evaporation techniques, by a deposit of a resistive or semiconductor material in the form of a central stud 18 surrounded by an annulus 19. A first series of strip conductors 20 is so deposited as to make contact to the annuli 19, and a second series of strip conductors 21 is so deposited as to make electrical contact with the central studs 18.

Figure 3:
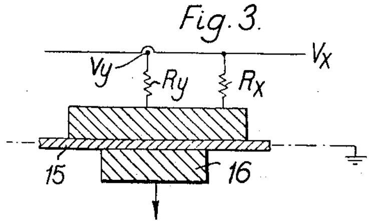
FIGS. 3 and 4 illustrate single elements of the coincident current store in the two alternative conditions.
Figure 4:
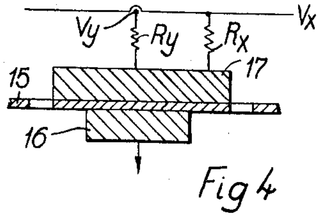

Before the conductors 20 and 21 are deposited, the discs 17 and the associated resistive material together with the conductors 20 are buried in an insulating material 22 which provides a mechanical foundation for the conductors 20 and 21. Of course, provision is made for the conductors 20 and 21 to make electrical contact with the annuli 19 and the studs 18 respectively. FIG. 3 shows the equivalent circuit of one of the elements of the store described with reference to FIGS. 1 and 2, before any information has been read into the store, and FIG. 4 shows the same element after it has been processed.

Figure 5:
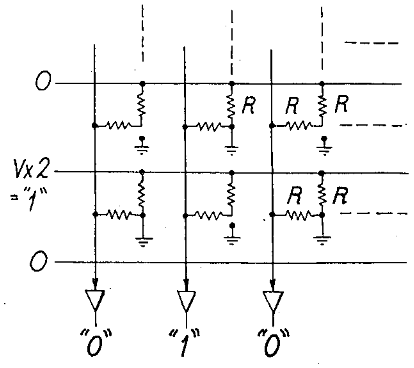
FIG. 5 illustrates how a coincident current store may be read.

The operation of the information store is as follows; let voltages $V_x$ and $V_y$ be applied to the row and column conductors 21 and 20 respectively, then currents are supplied to the discs 17 through the resistors $R_x$ and $R_y$. Thus, if $V_x = V_y = V$ and $R_x = R_y = R$, when both of the voltages are applied the current supplied to the discs 17 is 2V/R. By a suitable choice of values for the various parameters, this can be made to be sufficient to fuse the layer 15 in the region of the periphery of the discs 17 but not elsewhere, thus acting as the "write" current. If the voltage source supplying $V_x$ or $V_y$ is not energised, then the current will be equal to V/R only, which will be insufficient to fuse the layer 15 at all. If read-out voltages $V_x$ and $V_y$ (<V) are then applied to the conductors 20 and 21, an output voltage $V_o = (V_x + V_y)/2$ or 0 will appear at each of the contacts 16. Furthermore, if either conductor 20 or conductor 21 only is energised, then a stored "word" of $n$ bits is available in parallel at the unenergised conductor because only those elements which are storing information will have any appreciable coupling between the conductors 20 and 21. Thus in FIG. 5 $V_{y1}$ and $V_{y3}$ are zero due to unfused elements, and $V_{y2}$ is >0 due to the fused element. The smallest output signal is given by $V_{y2} = V_{x2}/2n - 1$. This is changed into a standard voltage representing 0 or 1 by means of threshold amplifiers.

Figure 6:
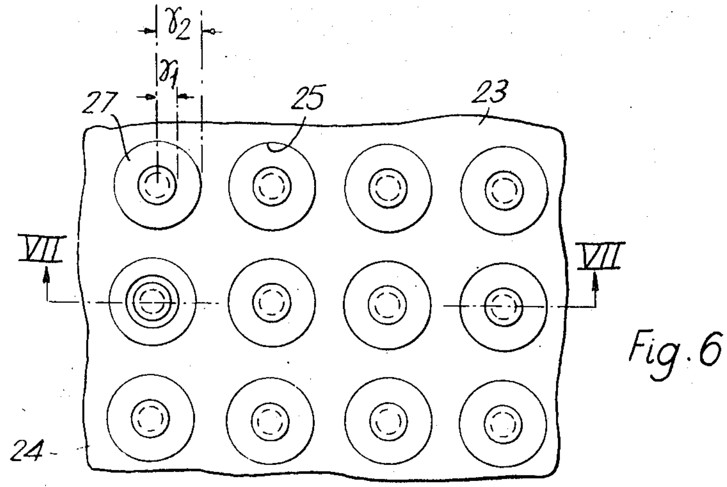
FIG. 6 is a plan view of another store in accordance with the invention.
Figure 7:
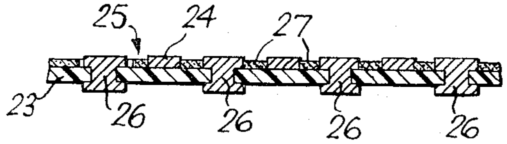
FIG. 7 is a sectional view taken on the line VII—VII of FIG. 6.

FIGS. 6 and 7 show a plan and elevation of an embodiment of the invention which is a development of the arrangement described with reference to FIGS. 6 and 7. In this embodiment of the invention an insulating substrate 23 has a layer 24 deposited upon it. The layer 24 is made of a high conductivity metal such as gold. As before, an array of circular holes 25 is formed in the conductive layer 24. Conductors in the form of metal studs 26 passing through the substrate 23 are positioned in the centres of the holes 25 and the annular gaps betwen the studs 26 and the layer 24 are filled with a resistive material to form disc-shaped resistors 27. The studs 26 project from both sides of the substrate 23 by equal amounts so that when two or more substrates 23 are juxtaposed in a manner shown in FIG. 8, good electrical contact is made between the studs 26 of one substrate 23 and those of another.

The resistance of an element of a resistor 27 at a radius $r$ is $dR = \rho\delta r/2\pi rt$ where $\rho$ is the resistivity of the material from which the resistor is made and $t$ is its thickness. The total resistance is given by the expression $R = \rho/2\pi t \ ln\ (r_2/r_1)$ where $r_2$ and $r_1$ are the outer and inner radii respectively. The power density in the element is $I^2\ \rho/(2\pi t)^2 r^2$ and is a maximum at $r = r_1$. By a suitable choice of applied voltage therefore, the resistors 27 can be caused to fuse over a narrow region in the immediate vicinity of the studs 26, as illustrated at the left hand end of the centre row of FIG. 6, and in FIG. 7.

Figure 8:
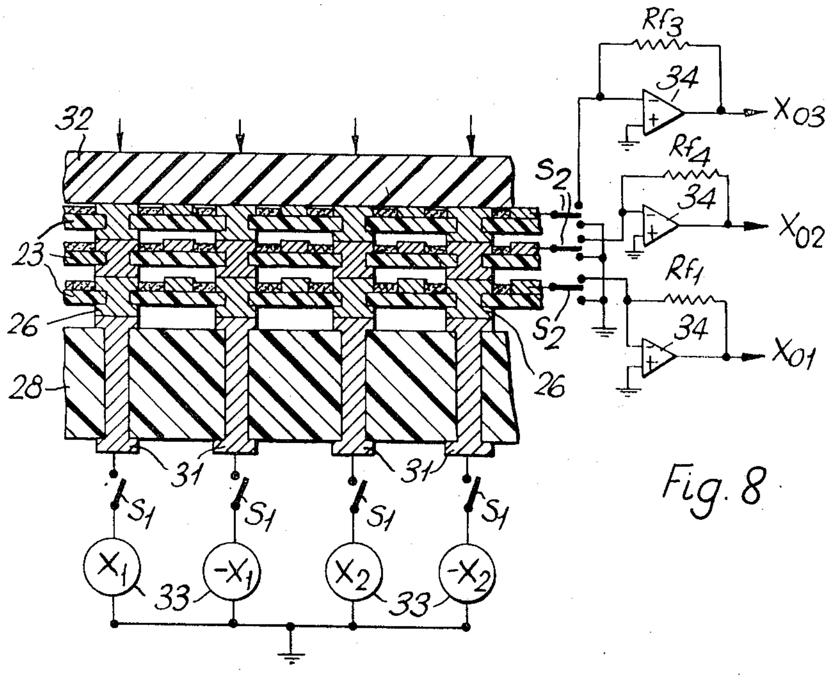
FIG. 8 shows diagrammatically a pattern recognition system utilising the embodiment of FIGS. 6 and 7.

FIG. 8 shows a pattern recognition system in which a number of information stores are placed in register with one another. For the purpose of describing this embodiment, the information stores will be referred to as "memory planes." A supporting plane 28 has an array of input contacts 31 which are in register with the studs 26 of the lowermost substrate 23. The substrates 23 are urged together by means of a spring-loaded pressure pad 32. The pressure pad 32 is made of an insulating material. If the substrates 23 are not resilient, the studs 26 include spring contacts (not shown) to ensure good electrical connection. A series of switches $S_1$ connects individual voltage sources 33 to the input contacts 31 and a series of switches $S_2$ enables the conductive layers 24 of the substrates 23 to be connected either to earth or to a series of operational amplifiers 34, each of which is associated with a respective substrate 23.

Figure 9:
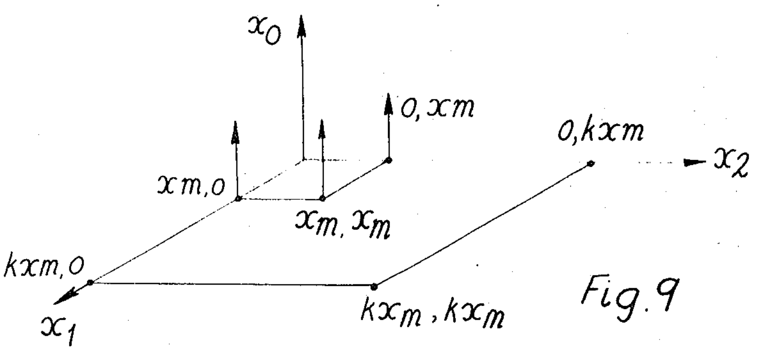
FIG. 9 is a schematic representation illustrating the operation of the pattern recognition of FIG. 8.

The pattern recognition system shown in FIG. 8 is illustrative only and for simplicity makes use of only two input signal voltages $x_1$ and $x_2$ and three output signals, designated $x_{01}$, $x_{02}$, and $x_{03}$; it is apparent however, that the system is capable of extension to very large numbers. Each input signal is assumed to exist as a positive signal, together with its negative value, at a pair of terminals. Only positive, or zero values of $x_1$ and $x_2$ are permitted and any input pattern may be represented as a point on the $x_1$, $x_2$ plane, as illustrated in FIG. 9. The output signals $x_{01}$, $x_{02}$ are represented by distances in the $-x_o$ direction perpendicular to the $x_1$, $x_2$ plane. For example, suppose that the pattern $x_1 = 0$, $x_2 = x_m$ is to be classified as output 1, the pattern $x_1 = x_m$, $x_2 = 0$ is to be classified as output 2, and $x_1 = x_m$, $x_2 = x_m$ is to be classified as output 3. The current $\pm m/R$ produced by the voltage $\pm x_m$ is arranged to be too small to produce any significant change in the resistive links of resistor R. The three input patterns are represented by the three points in FIG. 9.

The three memory planes utilised are written into by closing an appropriate "write" classification switch $S_1$ corresponding to each input pattern when only a positive or a negative pattern signal $\pm k\ x_m$ is present, the other signal being 0. Thus, if $x_2$ is $x_m$ in the training pattern only $-x_2 = -kx_m$ is supplied to the appropriate memory plane. This can be achieved by opening the switch to $x_2$ and leaving the switch $-kx_2$ closed. The classification switch $S_2$ corresponding to the particular plane in which a particular signal is to be stored is closed, connecting that plane to earth and the current through each resistor of that plane produced by the voltage $\pm kx_m$ is $I = \pm kx_m/R$ which is arranged to be such as to cause reliable fusing of the resistors to which this voltage is applied.

In the example discussed above, the lowermost plane supplying the output signal $x_{01}$ requires the resistors connected to $x_2$ and $-x_1$ to remain intact and it is therefore necessary to fuse the resistors connected to $-x_2$ and $x_1$. This is accomplished by connecting the switch $S_2$ in the first memory plane to earth, closing the switches $S_1$ connected to $-x_2$ and $x_1$ and making $-x_2 = -kx_m$ and $x_1 = \pm kx_m$.

When the signal is increased from $x_2 = x_m$ to $kx_m$ the power dissipated in the resistor increases by a factor of $k^2$ so that a large safety margin is easily obtained. When all the planes have been written into by a similar procedure, and it is desired to read the memory store in the pattern recognition mode of operation, all the switches $S_1$ are closed and all the switches $S_2$ are operated to connect the memory planes to associated operational amplifier inputs. A pattern to be recognised represented by voltages $\pm x_m$ is then applied to all the inputs and the memory plane containing the closest training pattern produces the largest output.

It has been assumed that the operational amplifiers have feed-back resistors $R_f$ which have a value for each plane of $R/n$ where $n$ is the number of input signals above the average value $\bar{x}$. The correct values of $R_f$ can be produced automatically by means of resistor memory planes. For example, a resistor memory plane having $d$ resistors formed on it can be connected to $d$ input voltages $kx_{mr}$ ($r = 1, 2, 3, \ldots d$), the output of the plane being connected to earth. During the writing operation the signals $kx_{mr}$ are zero if $x_r$ is greater than $x$ in the training pattern and $kx_m$ if $x_r$ is equal to or less than $x$. This will leave $n$ resistors intact and the remainder, $(d - n)$ will be fused. If a good-conducting shorting plane is placed over all the studs of the memory plane, the resistance between the memory plane and the shorting plane is thus $R/n$ as required. This procedure can be repeated for each training pattern to produce a corresponding set of values for $R_f$.

Figure 13:
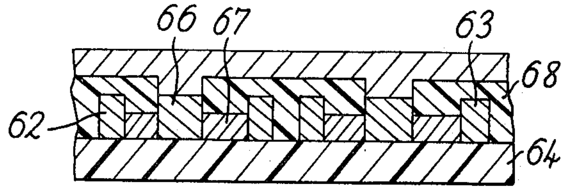
FIG. 13 is a sectional view taken on the line XIII—XIII of FIG. 12.

An alternative system to that illustrated in FIG. 13 uses a pair of memory planes per output amplifier and the output amplifiers are differential amplifiers. Resistors in one or other of each pair of planes are fused in accordance with the information to be stored. With this system, a constant voltage added to both inputs of each pair (such as may be caused by background illumination in an optical pattern recognition system), has no adverse effect. Moreover, the feedback resistors $R_f$ are all of the same value since the total number of intact resistors in each pair of planes is the same for all pairs.

Figure 10:
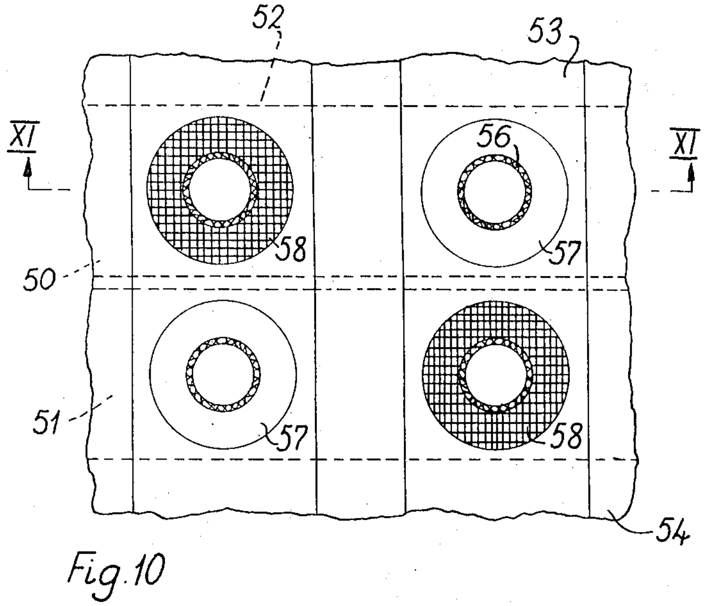
FIG. 10 is a plan view of part of another store in accordance with the invention.
Figure 11:
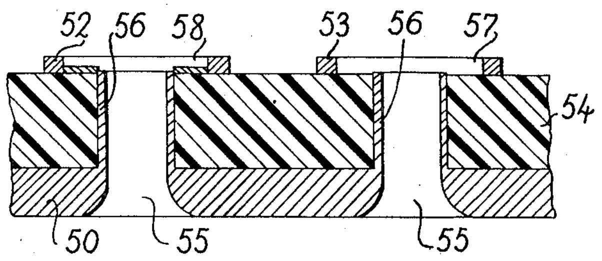
FIG. 11 is a sectional view taken on the line XI—XI in FIG. 10.

FIGS. 10 and 11 show another embodiment of the invention. Only two input conductors 50 and 51 are two output bus-bars 52 and 53 are shown but it should be realised that the same pattern is repeated over the whole M × N matrix of cross-overs. The information store consists of an insulating substrate 54 which has formed in it a square array of holes 55. The input conductors 50 and 51 are formed on the lower surface of the sheet by a deposition technique, which at the same time deposits a conductive layer upon the exposed sides of the holes 55 so that connecting studs 56 are formed through the substrate 54 to the other side. The output conductors 52 and 53 are formed on the upper surface of the substrate 54 and are arranged to be at right angles to the input conductors 50 and 51. Holes 57 are formed in the output conductors 52 and 53 where they cross the connecting studs 56 formed by the through-plating of the lower surface. The areas between the studs 56 and the output conductors 52 and 53 are filled by a thin layer 58, of resistive material to produce resistors of resistance R. Initially resistors are provided in all the holes 57 on the substrate. Each unwanted resistor is then fused, in accordance with the invention by supplying the two bus-bars connected with it with voltages $\pm v$ and $-v$ so that it is subjected to a potential difference $2v$ and an initial power of $4v^2/R$ watts is dissipated in the resistor. This is made to be sufficient to fuse the resistor leaving it in an open circuit condition. The other resistors remain undamaged since the power dissipated in them is only $v^2/R$ or less.

Figure 12:
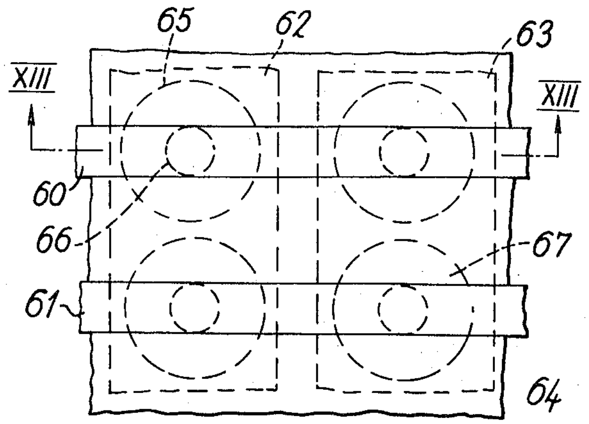
FIG. 12 is a plan view of part of yet another store in accordance with the invention.

FIGS. 12 and 13 illustrate a modification of the embodiment shown in FIGS. 10 and 11 which avoids the need to provide holes in the substrate. Once again, only two input conductors 60 and 61 and two output conductors 62 and 63 are shown. As already mentioned, the substrate 64 does not contain holes. The output conductors 62 and 63 are formed on the upper surface of the substrate 64 by a deposition technique. Holes 65 are formed in the output conductors 62 and 63 where they intersect the input conductors 61 and 62 and a disc 66 of conductive material is formed at the centre of each hole 65 to form a stud to which the corresponding input conductor may be connected. The areas between the discs 66 and the output conductors 62 and 63 are filled by a thin layer 67 of resistive material and the entire substrate is then covered by a layer 68 of insulating material which is removed to expose the discs 66. The input conductors 60 and 61 are then deposited on top of the insulating material 68. The store operates in a similar manner to the store illustrated in FIGS. 10 and 11.

With either of the embodiments illustrated in FIGS. 10 and 11 and FIGS. 12 and 13, the resistance of the resistors 58 and 67 may be increased by arranging for only a sector of the annulus to be filled with resistive material. For example, if the resistive film is formed by depositing resistive material over the entire surface of the substrate and then etching away unwanted parts, it is simple to arrange for a greater part of the film to be etched away. An alternative arrangement, giving an even higher resistance is to arrange for only a thin spiral filament, occupying the holes 57, 65 to connect the input conductors to the output conductors.

Figure 14:
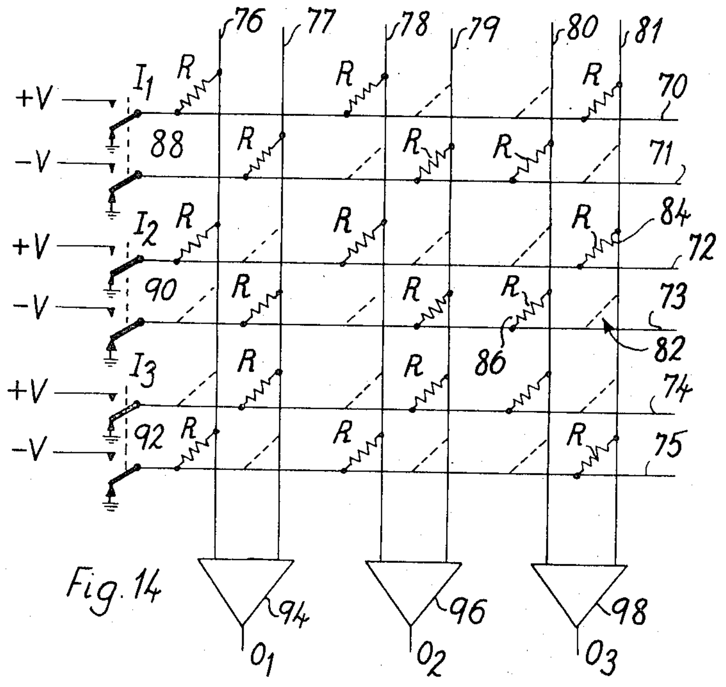
FIG. 14 is a schematic diagram of a memory device incorporating a store in accordance with the invention.

FIG. 14 illustrates a memory device incorporating a store in accordance with the invention. The stores illustrated in FIGS. 10 and 11 and FIGS. 12 and 13 are particularly suitable. The memory device illustrated in FIG. 14 consists of three pairs of input bus-bars 70 and 71, 72 and 73, 74 and 75 and three pairs of output bus-bars 76 and 77, 78 and 79, 80 and 81 arranged to overlap the input bus-bars at right angles. Although only three pairs of input and output bus-bars are shown, in general a much greater number of such pairs will be provided. At each set of four intersections of the input and output pairs of bus-bars, such as the set 82, there remain, after fusing, a pair of interconnecting resistors such as the resistors 84 and 86 of approximately the same value. At each intersection, a selected input bus-bar is connected to a selected output bus-bar by one of the resistors and the other input bus-bar of the pair of input bus-bars is connected to the other output bus-bar of the pair of output bus-bars by the other resistor, the selected connections forming a pattern which corresponds with information stored in the memory device. For example, at the intersection 82, the resistor 84 connects the bus-bar 72 to the bus-bar 81 and the resistor 86 connects the bus-bar 73 to the bus-bar 80.

When the memory device is to be used with digital signals as a coder or a programmable read-only memory, three input signals $I_1$, $I_2$ and $I_3$ are applied from sources (not shown) to three pairs of ganged switches 88, 90 and 92 each of which controls the application of an input voltage +V to a respective one of the bus-bars 70, 72 and 74, and the application of an input voltage −V to the bus-bar 71, 73 and 75 corresponding to the selected bus-bar 70, 72 or 74. Although switches 88, 90 and 92 are shown as mechanical switches, in practice high speed electronic circuits are preferable, and a suitable circuit will be described later. The arrangement is such that when the input $I_1$ represents a logical 1 for example, the corresponding ganged switch 88 controlled by the input $I_1$ changes to the upper position shown in FIG. 1, so that the voltage +V is applied to the bus-bar 70 and the voltage −V minus is applied to the bus-bar 71. If only one of the inputs is a 1 and the remainder are all 0 then all the other pairs of input bus-bars will be at zero or earth potential. Assuming, for example, that $I_2 = 1$ and $I_1 = I_3 = 0$, the voltages on the bus-bars 72 and 73 will be +V, and −V respectively and the voltages on the other input bus-bars 70, 71, 74, and 75 will be 0. Since the non-zero input voltage is connected to earth via N similar paths each consisting of a single resistor of resistance R in series with a parallel circuit consisting of (M − 1) resistors of resistance R (where M is the total number of input bus-bar pairs), the voltages on the output bus-bars will all be equal in magnitude given in general by Output Voltage Magnitude = $(R/M - 1 \cdot V)/R + R/M - 1) = RV/(M - 1)\ R + R = V/M$ In the embodiment shown in FIG. 1, the magnitude of the output voltage is therefore ⅓V. The sign of each output voltage depends on whether the active input line of the pair 72 supplying the particular output line is supplied by +V or −V, which is determined by the positions of the resistors at the relevant intersection. Consequently, the voltages on the output bus-bars 76, 78 and 81 will be +⅓V and the voltages on the output bus-bars 77, 79 and 80 will be −⅓V.

A respective differential amplifier 94, 96 and 98 is connected between each pair of output bus-bars 76 and 77, 78 and 79, 80 and 81 to provide final output signals $0_1$, $0_2$, $0_3$. Each differential amplifier is arranged to give an output when the difference between the positive and negative signal applied to it exceeds a minimum value Δ, the output representing 1 when the algebraic difference is positive and representing 0 when the algebraic difference is negative. In the illustrated embodiment, if $\Delta = V/M$ the output $0_1$ represents a 1 since the difference between the voltages on the bus-bars 76 and 77 $= (V/M - (-V/M)) = 2V/M > V/M$. The second output is also 1 for a similar reason and the third output is 0 since the difference between the voltages on the bus-bars 80 and 81 $= (-V/M - V/M) = -2V/M < -V/M$. Considering a larger memory device than that shown in FIG. 1, where M = 100, then if the supply voltages are ±10 V the value of $\Delta = 10/100 = 0.1$ volt, which is sufficient to drive a matched transistor pair differential amplifier with perfect reliability so that only one transistor is strongly conducting. As M increases to much higher values it may be necessary to increase the amplification of the differential amplifier equivalent to the amplifiers 94, 96 and 98 so that an unambiguous final output is obtained. The low impedance at the input terminals of these amplifiers (i.e. R/M) ensures that the memory is insensitive to stray pick up and the impedance becomes lower as M increases.

Figure 15:
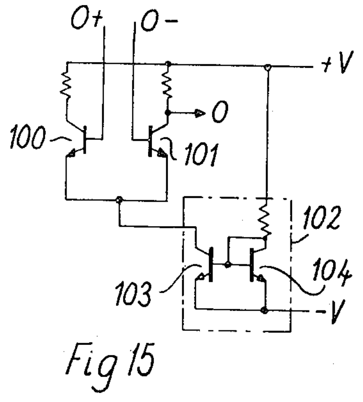
FIG. 15 is a circuit diagram of a differential amplifier for use in the memory device of FIG. 14.

A suitable form of differential amplifier is shown in FIG. 15. The transistors 100 and 101 are preferably a matched pair and the current source 102 in the emitter circuit may be provided by third and fourth transistor 103 and 104 as illustrated, although an alternative current source may be used.

Figure 16:
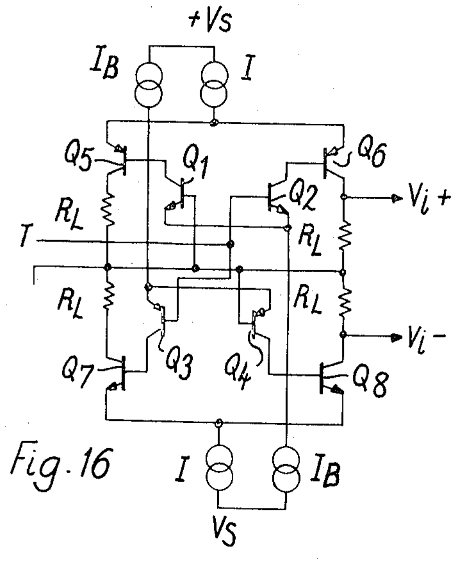
FIG. 16 is a circuit diagram of an input circuit for use with the memory device of FIG. 14.

Electronic circuits which perform the function of the input switches may also be constructed with differential amplifier units as illustrated in FIG. 16. The circuit shown in FIG. 16, in common with the circuits shown in FIG. 15, is suitable for fabrication as an integrated micro-circuit preferably on the same chip as the resistor memory device. The circuit shown in FIG. 16 operates under the control of an input control voltage to produce a pair of input voltages $V_{i+}$ and $V_{i+}$, one such circuit being required for each pair of input bus-bars 70 and 71, 72 and 73, 74 and 75. In the resting state the control voltage at terminal T is negative so that $Q_3$ and $Q_1$ conduct thereby supplying their base current $I_B$ which is made greater than $I/h_{FE}$ to $Q_7$ and $Q_5$, making them conduct. Thus $Q_6$ and $Q_8$ are cut-off and $V_{i+}$ and $V_{i-}$ are at zero potential.

When a pair of input bus-bars are to be selected, the control voltage at terminal T goes positive so that $Q_2$, $Q_4$, $Q_6$ and $Q_8$ conduct, making $V_{i+} = 1R_L = +V$ and $V_{i-} = -1R_L = -V$. In practice these voltages are modified due to the input resistance of the matrix $R_i$ which is in parallel with $R_L$. This can be compensated by an increase in I so that the required input voltage is still obtained. The input resistance is approximately R/N and for $M >> 1$ if $R_L$ is chosen to be $R_N$, the input voltages are $V_i = IR/2 = +V$ and $V_i = -IR/2_N = -V$.

As stated above, the magnitude of the voltage difference between the bus-bars of an output pair is 2V/M. For the well matched transistors that are easily formed by integrated circuit techniques a difference of 0.1 volt gives reliable indications on the output $O_n$ of the stored digit at the intersection of the corresponding output pair and any of the input pairs. Thus for N = M = 30 and R = 1 kΩ the voltage difference $$IR/NM = I\ 1000/900.$$

For this to be 0.1 volt I must be approximately 100 mA, which is readily obtained from pulsed transistors. Assuming a duty cycle of 0.5 the mean input power to this 900 bit matrix is $0.5 \times 2 \times I^2 R/2N = (0.1)^2 10^3/2 \times 30 = 1_W/6$ which is reasonable for the specified number of bits.

The whole memory device comprising the input circuits, resistor matrix and output circuits may be produced by large-scale integrated micro-circuit techniques in a very small area. A 10,000 bit memory complete with input and output circuits may only occupy 0.1 in.$^2$ and with a packing density of only 100 planes per inch this corresponds to a capacity of $10^8$ bits/in.$^3$.

The memory device shown in FIG. 14 may also be used as a decoder with either digital or analog signals. Differential input signals are connected directly to all the input bus-bars 70 to 75 and the amplifiers 94, 96 and 98 are differential amplifiers with feedback as required. The differential input signals may be produced by amplifiers of a type similar to that shown in FIG. 15, the input bus-bars of each pair being connected to the collectors of transistors 100 and 101 respectively, a fixed reference voltage being applied to the base of one transistor and the input signal to the base of the other. The required output is that having maximum (or in some circumstances, minimum) value. Since the input signals are differential signals, a common signal, such as noise or a biasing voltage, added to each input signal has no effect on the output signals, such a signal being subject to common mode rejection.

Figure 17:
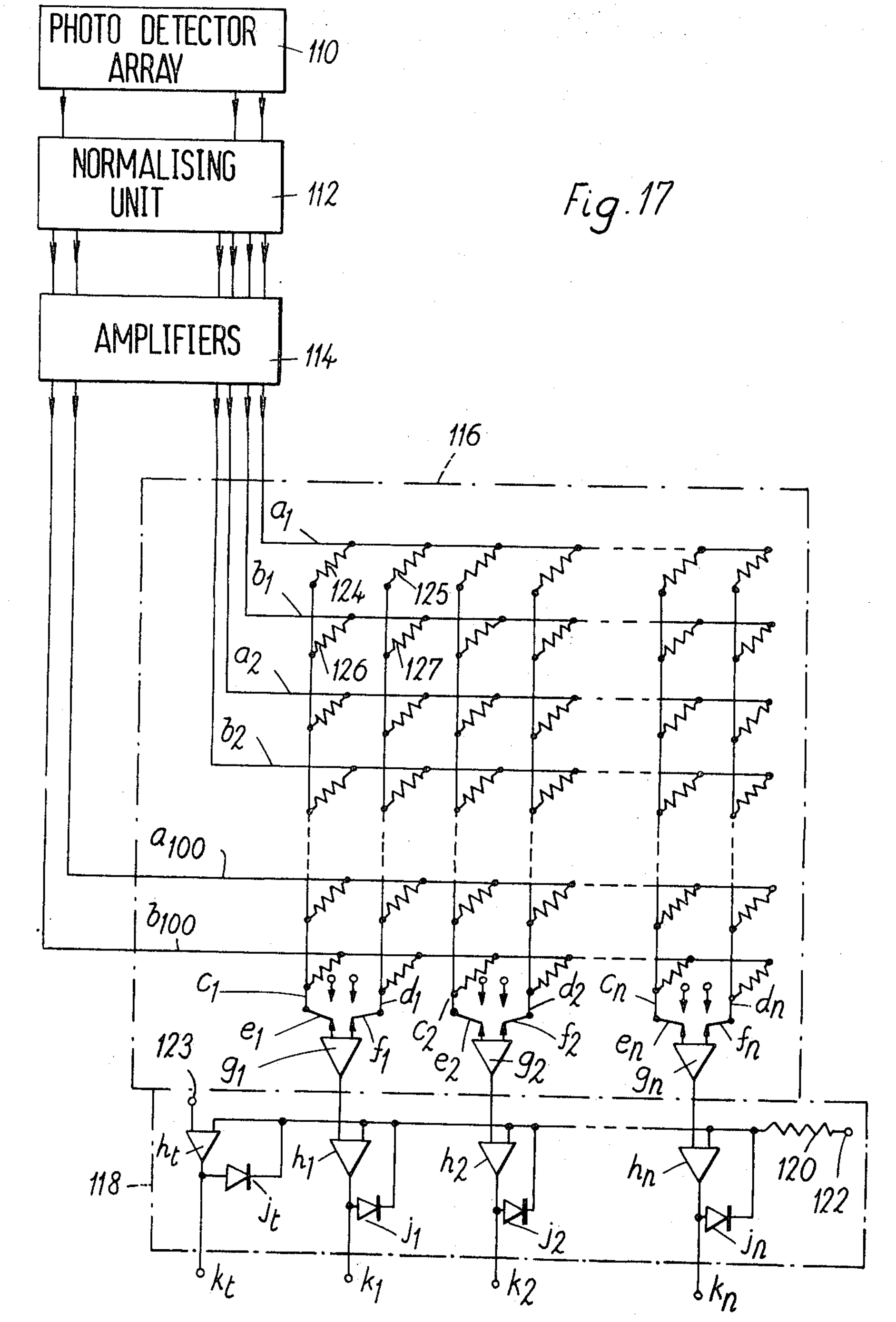
FIG. 17 is a schematic diagram of pattern recognition apparatus employing a memory device of the type shown in FIG. 14.

One example of the use of a memory device in accordance with the invention as an analog decoder is its use in pattern recognition. The pattern recognition apparatus illustrated in FIG. 17 operates on a ten by ten matrix. The input to the apparatus comprises a ten by ten photo-detector array 110, each photo-detector being arranged to produce an output voltage proportional to the illumination incident thereon. The photo-detectors of the array 110 are connected to a normalizing unit 112 which is arranged to determine the sum of the maximum and minimum outputs from the photo-detectors in the array 110 and subtract half this reference value from the output of each individual photo-detector. The normalising unit 112 is arranged to produce a differential output on a respective pair of leads corresponding to each photo-detector, the signal on a first lead of each pair being positive and that on the second negative when the corresponding photo-detector is receiving more illumination than would be indicated by the reference value, indicating that it is confronting a relatively light area, and vice versa if the corresponding photo-detector is receiving less illumination than average indicating that it is confronting a relatively dark area. The required positive and negative signals can be produced by the normalising unit even if the pattern is effectively in two shades of grey, such as might happen if the original is a poor quality carbon copy of a typewritten document.

As an alternative, the normalising unit 112 may be arranged to subtract the average value of the outputs from the photo-detectors in the array 110 from the output of each individual photo-detector. However, this has the disadvantage that, in the event that there is, say, only one photocell confronting a relatively dark area and all the remaining photocells are confronting relatively light areas, such average value will not be very different from the outputs of photocells confronting relatively light areas. Consequently, if a smudge, for example, causes one of the photocells confronting the light area to produce an intermediate output, this may register as a dark area.

The pairs of outputs from the normalising unit 112 are connected via respective differential amplifiers to corresponding pairs of input conductors of a memory device 116.

The memory device 116 is of the type illustrated in FIG. 14. The input conductors are grouped in pairs, one conductor of each pair being denoted by the reference letter *a* and the other by the reference letter *b.* The pairs of input conductors are numbered from 1 to 100. Similarly, the output conductors are also grouped in pairs with one conductor of each pair denoted by the reference *c* and the other by the reference *d.* The pairs of output conductors are numbered from 1 to *n*, *n* being the maximum number of distinct patterns which the apparatus can be arranged to recognise.

The resistive fusible links are arranged to fuse if a voltage not less than V is applied between the respective input and output conductors.

The output conductors $c_1$ to $c_n$ and $b_1$ to $d_n$ are connected to respective two position switches $e_1$ to $e_n$ and $f_1$ to $f_n$. With these switches in the positions shown, each pair of output conductors is connected to the inputs of a differential amplifier $g_1$ to $g_n$, the outputs of which form the output of the memory device. With the *e* and *f* switches in the alternative positions, the output conductors $c_1$ to $c_n$ and $d_1$ to $d_n$ are connected to respective input terminals to which fixed voltages may be applied during training as will be explained hereinafter.

The outputs from the memory device 116 are connected to a maximum selector circuit 118. This consists of a set of differential amplifiers $h_1$ to $h_n$, each of which has a non-inverting input connected to the output of the corresponding amplifier $g_1$ to $g_n$ in the memory device 116. An inverting input of each amplifier $h_1$ to $h_n$ is connected via a common resistor 120 to a negative voltage supply terminal 122. The output of each amplifier $h_1$ to $h_n$ is connected via a respective diode $j_1$ to $j_n$ with polarity as shown in FIG. 1, to its second input. Each amplifier output is also connected to a respective output terminal $k_1$ to $k_n$.

The maximum selector circuit 118 also includes an additional amplifier $h_t$ with its second input connected to the common resistor 122. A diode $j_t$ connects the output of the amplifier $h_t$ to its second input but its first input is connected to a terminal 23 to which a threshold voltage $V_t$ is applied.

In operation, the voltage applied to the second input of each of the *h* amplifiers is (ignoring the voltage drop across the diodes *j*) equal to the output voltage of the *h* amplifier having the most positive output which is, of course, the *h* amplifier having the most positive voltage at its first input. Consequently, the *h* amplifer having the most positive first input gives unity gain and so produces a positive output signal on its terminal *k* while all other *h* amplifiers are driven into negative saturation.

The following description will be with reference to the recognition of two dimensional patterns consisting of black and white discrete elements, although the apparatus can be adapted for the recognition of any pattern which consists of intensity variations about a mean level. As already mentioned a pair of output conductors *c* and *d* are allotted to each sample pattern.

During programming or training, the *e* and *f* switches are set to disconnect the *c* and *d* output conductors from their respective amplifiers. The amplifiers 114 are each set to have relatively high gain so as to produce a clipped output of magnitude $(v + 2V/3)$, the polarity being the same as that of their respective inputs. The voltage $v$ is a constant voltage which may be of any convenient magnitude. Each sample pattern is applied in turn to the input conductors, the voltage $v + 2V/3$ being applied to the $a$ conductor of each pair and the voltage $v - 2V/3$ to each $b$ conductor for white areas and the voltage $v - 2V/3$ being applied to the $a$ conductors and the voltage $v + 2V/3$ to the $b$ conductors for pairs corresponding to black areas. During this time, the voltage $v$ is applied to all the output conductors except the pair corresponding to the sample pattern being applied to the input conductors. Of this pair, the voltage $v + 2V/3$ is applied to the $c$ conductors and the voltage $v - 2V/3$ to the $d$ conductor.

For example, if in the sample pattern corresponding to the pair of output conductors $c_1$ and $d_1$, the element corresponding to the conductors $a_1$ and $b_1$ is white, the links 124 and 127, connecting conductors $a_1$ and $c_1$ and conductors $b_1$ and $d_1$ respectively, have zero voltage across them. On the other hand, the links 125 and 126 connecting conductors $a_1$ and $d_1$ and $b_1$ and $c_1$ respectively have voltage 4V/3 across them which causes them to fuse. On the other hand, had the element corresponding to the conductors $a_1$ and $b_1$ been black, the resistors 124 and 127 would have fused and the resistors 125 and 126 remained intact.

Since all the other output conductors have the voltage $v$ applied to them, all the other links connected to the input conductors $a_1$ and $b_1$ are subjected to a voltage 2V/3 and consequently remain intact.

After training, the apparatus is ready to recognise unknown patterns. The $e$ and $f$ switches are set to connect the $c$ and $d$ output conductors to the respective $g$ amplifiers and the gain of the amplifiers 114 is reduced so that, although the magnitude of the output therefrom is still limited to $\pm(v + 2V/3)$ thereby preventing inadvertent fusing of memory elements, the apparatus does not attempt to recognise as a pattern, noise caused for example by smudges on the original.

An unknown pattern to be recognised is applied to the input conductors $a_1$ to $a_{100}$ and $b_1$ to $b_{100}$ using corresponding voltages to those when training patterns were being applied. It is assumed, by way of example, that the unknown pattern has sufficient contrast for the inputs to the amplifiers 114 to be of sufficiently high level for the corresponding outputs to be clipped at $\pm(v + 2V/3)$. If one of the training patterns consisted of 1 white squares and $p - l$ black squares, the $c$ output conductor is supplied with $p$ signals of value $v + 2V/3$, of which $l$ are due to white squares and $p - l$ to black squares. Similarly, the output conductor $d$ is supplied with $p$ signals of value $v - 2V/3$ of which $l$ are due to white squares and $p - l$ to black squares. Thus, the resultant output $y$ of the $g$ amplifier due to the difference between the signal on the $c$ conductor and the signal on the $d$ conductor is given by $$y = K \left\{ p(v + 2V/3) - p(v - 2V/3 \right\} = 4/3\ KpV$$

where K is a gain constant. K is preferably chosen to be $1/2p$ in which case the output signal becomes 2V/3 which is thus suitable for direct use as an input to a further memory if desired.

I claim:

1. A memory device comprising insulating material supporting a plurality of first conductors, a plurality of second conductors and a plurality of electrical resistor links each providing an ohmic connection between a first conductor and a second conductor, each link comprising a film of electrically conductive material deposited on said insulating material and having dimensions and electrical resistance such that application of a voltage of a predetermined magnitude between a first conductor and a second conductor causes fusing of the corresponding link over an annular area of said film surrounding said first conductor but application of a voltage of half said predetermined magnitude does not cause fusing of said link.

2. A memory device as claimed in claim 1, in which said film is sandwiched between two matrices of conducting discs, the discs of one of said matrices being disposed in holes in said insulating material, the first conductors being arranged in rows and columns with the discs of one matrix connected both to a row conductor and a column conductor, a single further conductor being connected to the film whereby an annular area of the film may be fused around a disc by coincident current addressing.

3. A memory device as claimed in claim 1, in which said first conductors are disposed on one side of the resistive material and said second conductors are disposed on the other, said second conductors including elements projecting through said resistive material and into holes in said first conductors and said links comprising annular films of conductive material in said holes in said second conductors.

4. A memory device as claimed in claim 3, in which said elements projecting through said resistive material comprise electrically conductive material plated on to the walls of holes in said insulating material.

5. A memory device as claimed in claim 3, in which said first conductors and said links are deposited on a substrate of an insulating material and said first mentioned insulating material comprises a coating on said first conductors and said links, said coating to said first conductors and including elements projecting through said coating into contact with said links.

6. A memory device as claimed in claim 3, in which said first conductors are disposed parallel to each other and perpendicular to said second conductors and said links are disposed at intersections of first and second conductors.

7. A memory device comprising insulating material supporting a plurality of pairs of first conductors, a plurality of pairs of second conductors, and a plurality of electrical resistor links each providing an ohmic connection between a first conductor and a second conductor, each link comprising a film of electrically conductive material deposited on said insulating material and having dimensions and resistance such that application of a voltage of a predetermined magnitude between a first conductor and a second conductor causes fusing of the corresponding link over an annular area of said film surrounidng said first conductor but application of a voltage of half said magnitude does not cause fusing of said link, two of the four links between each pair of first conductors and each pair of second conductors having been fused so that one of the pair of first conductors is connected to one of the pair of second conductors and the other of the pair of first conductors is connected to the other of the pair of second conductors.

8. A memory device as claimed in claim 7, comprising a respective differential amplifier having its inputs connected to each pair of second conductors and respective switching means connected to each pair of first conductors and operative either to apply earth potential to both conductors of the pair or to apply a positive potential to one conductor of the pair and a negative potential to the other.

9. A memory device as claimed in claim 8, including a respective second differential amplifier for each first differential amplifier, one input of each second differential amplifier being connected to the output of the corresponding first differential amplifier, the second inputs of the second differential amplifiers being interconnected, and a respective diode for each second differential amplifier connecting the output thereof to its second input whereby the second differential amplifier having the largest signal at its first input produces a signal at its output and the remaining second differential amplifiers are cut off.

* * * * *